June 9, 1959

G. W. SCHROEDER 2,889,800

RANGE OVEN CONTROL

Filed Dec. 20, 1957

*INVENTOR.*
GEORGE W. SCHROEDER

BY T.G.Dypart

HIS ATTORNEY

United States Patent Office 2,889,800
Patented June 9, 1959

2,889,800

RANGE OVEN CONTROL

George W. Schroeder, Louisville, Ky., assignor to General Electric Company, a corporation of New York Application December 20, 1957, Serial No. 704,128

4 Claims. (Cl. 116—124)

This invention relates to range oven controls, and more particularly to a device of this nature particularly useful in indicating oven control switch and thermostat settings of an electric range oven control system.

A number of electric ranges now on the market include an oven equipped with an electric heating unit arranged at the top of the oven so as to supply radiant heat for broiling various foods (such as steaks, chops and the like) and another electric heating unit located at the bottom of the oven so as to heat the air within the oven during baking operations. Such ranges commonly include an electrical circuit for the heating units provided with a manually operable switch for energizing the bake unit and the broil unit either singly or in combination (and in some ranges, a circuit including a timer arranged to provide timed baking operations) and also a manually adjustable thermostat for opening and closing the circuits in accordance with the oven temperature.

In operating ranges of the type just described, it will be understood that the oven control switch must be set so as to select one of the "bake," "time bake" or "broil" circuits, and the thermostat must be adjusted to the desired temperature. Since broiling operations are ordinarily carried on with the oven door at least partially open, and since it has been thought desirable to energize the broil unit continuously (the broiling rate being controlled by varying the distance between the food and the broil unit) oven thermostats ordinarily have a single "broil" setting located above the highest temperature on the baking temperature scale.

It has been discovered that other broiling techniques may be desirable in some instances, and in particular it has been learned that meats and the like may be broiled in a closed oven, the degree of internal doneness and surface browning being controlled by causing the broil unit to cycle on and off so as to regulate the heat energy transmitted to the food. Thus, broiling operations may be controlled in a manner similar to that employed during baking operations, and in fact the cycling of the broil unit results from thermostat control in accordance with air temperature although it will be understood that air temperature is not a measure of the cooking rate during broiling operations. It will thus be evident that the temperature indicia (usually expressed as ° F.) on the thermostat control are of little value in setting the thermostat for "closed door" broiling, and may actually confuse the housewife even if dual broil and bake scales are provided. Experience in the appliance field has time and again demonstrated the importance of eliminating such complex operating and control devices, and providing instead simple easily understood controls which are practically foolproof.

Accordingly, one of the objects of my invention is to provide an improved range oven control having an easily operated and easily understood visual indicator.

Another object of the invention is to provide a range oven control which includes means for indicating heating rates during both broiling and baking operations.

Another object of the invention is to provide an oven control device having indicating means for the oven circuit control and the oven thermostat which mutually cooperate to provide a correlated indication of the type of cooking operation for which the oven circuit is prepared and the heat setting of the oven thermostat.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention I provide a range oven control including a pair of movable actuators adapted to be connected to a thermostat and a control switch respectively, a movable temperature indicating member secured to the thermostat actuator, and a movable masking member secured to the switch actuator, the masking member having at least one window or opening located as to overlie a portion of the indicating member and reveal a portion of a geometrical pattern arranged thereon so as to provide an indication of the setting of the thermostat.

For a better understanding of this invention, reference may be made to the following description and the accompanying drawing in which.

Figure 1:
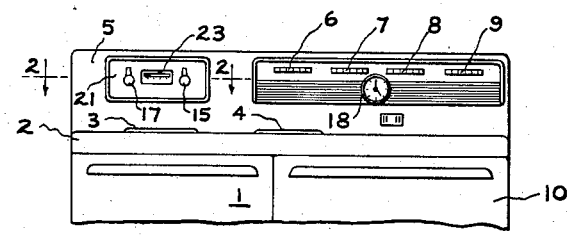
Fig. 1 is a fragmentary front elevation view of an electric range incorporating the range oven control of the present invention.

Referring to the drawing, the numeral 1 designates an electric range having a cooking top 2 on which are mounted surface heating units 3 and 4 and also a pair of rear surface heating units not visible in the drawing. A backsplasher 5 is located at the rear of cooktop 2 and mounted thereon are pushbutton control switches 6, 7, 8, and 9 which are individually connected in circuit with the surface heating units. Range 1 is also provided with an oven compartment closed by a door 10 and provided with an upper heating unit for broiling operations and a lower heating unit for baking operations. The oven heating units are connected in an electrical circuit with a thermostat 11 (which may be of any suitable type, such as that disclosed in Winborne Patent No. 2,354,933) and an oven circuit selector switch 12 (which may be of any suitable type, such as that disclosed in Randolph et al. Patent No. 2,203,236). Thermostat 11 and switch 12 are mounted within backsplasher 5, being supported on a mounting plate 13 fixedly secured by any suitable means to the front wall of the backsplasher 5. The thermostat and the oven switch are each provided with manually movable actuators, thermostat 11 being provided with a rotatable shaft 14 on which is mounted an operating knob 15 and switch 12 being provided with a rotatable shaft 16 on which is mounted a control knob 17. Range 1 is also equipped with a time switch 18 which may be connected in circuit with the oven heating units so as to close and open the oven circuit at predetermined times. Thermostat 11, control switch 12 and timer 18 may be connected in an electrical circuit of the type disclosed in Deas Patent No. 2,806,120, for example, although it should be understood that my invention is not limited to the particular oven structure and circuit arrangement disclosed herein.

From the description thus far, it will be understood that the various oven circuit arrangements useful in oven cooking operations may be selected by rotary movement of knob 17 to one of a plurality of setting positions, and that the desired cooking temperature may be obtained by rotating knob 15 to a position corresponding to the desired temperature. In the illustrated embodiment of my invention, switch 12 is a four position switch having an "off" position, a "bake" position, a "time bake" position and a "broil" position. As more fully disclosed in the aforementioned Deas patent, only the upper broil unit is energized when control switch 12 is in the "broil" position, only the lower bake unit is energized when the control switch is in the "time bake" position, and in the "bake" position the lower unit is energized at full wattage and the upper unit at a reduced wattage sufficient to supply necessary top heat for ordinary baking operations. With regard to the operation of thermostat 11, it will be understood that higher heat settings are provided as control knob 15 is rotated in a clockwise direction, the range of temperature settings for baking operations being from approximately 200° F. to 500° F.

Figure 2:
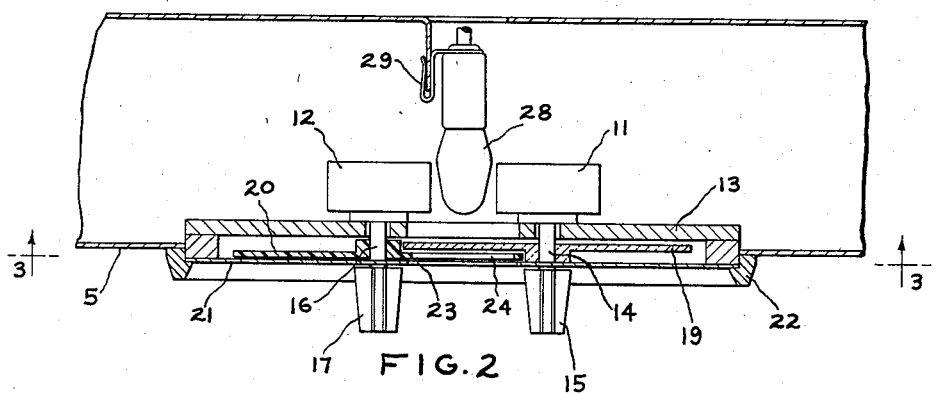
Fig. 2 is a cross-sectional view taken along the line 2—2 of Fig. 1.
Figure 3:
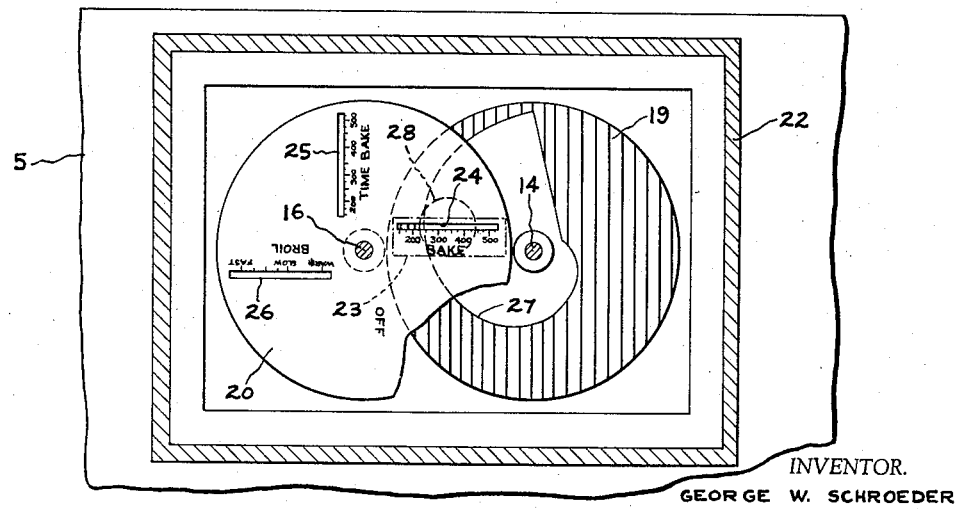
Fig. 3 is a cross-sectional view taken along the line 3—3 of Fig. 2.

In accordance with the present invention there is provided a range oven control including a visual indicator for indicating the settings of thermostat 11 and control switch 12, and in particular for indicating various broil rates which may be useful in broiling with the door closed. Referring to Figs. 2 and 3, a rotatable temperature indicating member 19 is fixedly secured by a friction fit or other suitable means to actuating shaft 14 of thermostat 11. Temperature indicator 19, which in the present embodiment is a translucent disk of plastic or other suitable material is arranged to cooperate with an opaque masking member 20 fixedly secured by a friction fit or other suitable means to actuating shaft 16 of control switch 12. Shafts 14 and 16 are mounted in spaced relation so that masking member 20, which in the present embodiment is in the form of a disk of opaque plastic or other suitable material, is arranged to partially overlie indicating member 19.

Oven switch 12 is constructed so as to have "bake," "time bake," "broil" and "off" positions corresponding to rotary positions of shaft 16 spaced at 90° intervals. Masking disk 20 is provided with corresponding indicia on its surface spaced at 90° intervals, the arrangement being clearly illustrated in Fig. 3. Temperature indicating member 19 and masking disk 20 are located behind a cover plate 21 provided with openings through which shafts 14 and 16 extend and secured in place by a bezel 22. Cover plate 21 is provided with a viewing aperture or window 23, which as shown in phantom in Fig. 3 is rectangular in shape, and is positioned so as to overlie a part of the space behind which temperature indicator 19 and mask 20 are in overlying relation. Thus, it will be evident that only the indicia on mask 20 positioned in alignment with aperture 23 is visible from the front of range 1.

In order to provide an indication of the temperature setting of thermostat 11, masking disk 20 is provided with generally radial slots or windows positioned adjacent the "bake," "time bake," and "broil" indicia respectively. Thus, an elongated window or slot 24 is formed in disk 20 adjacent the word "bake" so as to be visible through aperture 23 when shaft 16 is in the posititon illustrated in Fig. 3, and generally similar windows 25 and 26 are positioned adjacent the words "time bake" and "broil" respectively, it being observed that windows 24, 25 and 26 are spaced at 90° intervals around masking disk 20. Diametrically opposite window 25 there appears the word "off" which, when it appears in aperture 23 indicates that the switch 12 is in the off position.

Slot shaped windows 24, 25 and 26 are arranged to cooperate with a geometrical figure on temperature indicator 19 so as to provide an indication of the temperature setting of thermostat 11. Thus, in the present embodiment of my invention indicator member 19 is provided with a central area of one color (white, for example) and a peripheral area of another color (red, for example) as indicated by the lining in Fig. 3, the two areas having a common spiral boundary line 27 extending clockwise from a point adjacent the axis of shaft 14 to a point adjacent the periphery of indicator disk 19. From the foregoing, it will be evident that the red portion of temperature indicator 19 will appear through aperture 23 and slot 24 (or slot 25 or slot 26 as the case may be) as a narrow red line, and will present the appearance of a thermometer of the fluid-filled type. Temperature scales along the lengths of slots 24 and 25 are printed on the surface of masking member 20, and boundary line 27 is shaped so that it appears to move toward the high end of the scale as thermostat knob 15 is rotated toward the highest temperature setting, and thus the position of boundary line 27 as viewed through window 23 provides an indication of the temperature setting of thermostat 11. For example, the parts are shown in Fig. 3 in a position corresponding to a temperature setting of 250° F., and it will be understood that the curvature of line 27 is plotted so that the radial distance between it and shaft 14 varies in proportion to the temperature settings provided by thermostat 11.

As previously pointed out in this specification, the various settings of thermostat 11 useful in "closed door" broiling operations cannot be calibrated in terms of ° F. and hence a different calibration scale must be provided adjacent "broil" setting window 26. For example, as illustrated in Fig. 3, the terms "warm," "slow" and "fast" may be employed to indicate the rates at which broiling will proceed when knob 15 of the thermostat is positioned so that the boundary line 27 appears opposite these calibration terms.

In order to make the indicia appearing in aperture 23 clearly visible and easy to read a light source 28 may be mounted, by means of a spring clip 29 for example, within backsplasher 5 so as to direct light through the portion of temperature indicating member 19 underlying masking member 20. As described above, in the preferred embodiment of my invention temperature indicator 19 is formed of transulent material and hence light from source 28 is transmitted through slotted window 24 (or windows 25 or 26 as the case may be) so that the boundary line 27 between the contrasting colors of the two areas of the indicator disk is clearly visible.

While I have shown and described a particular embodiment of my invention, I do not desire the invention to be limited to the particular construction disclosed, and I intend by the appended claims to cover all modifications within the true spirit and scope of the invention.

What I claim is:

1. A range oven control comprising an oven thermostat having a first shaft rotatable through a range of temperature setting positions, an oven switch having a second shaft rotatable between "bake" and "broil" positions, each of said first and second shafts being independently rotatable irrespective of rotation of the other, a rotatable temperature indicating member secured to said first shaft, said indicating member having a spiral indicator line thereon extending from a point adjacent the axis of said first shaft to a point adjacent the periphery of said indicating member, a masking member mounted on said second shaft and arranged to partially overlie said indicating member, said masking member having a first window positioned so as to overlie said indicating member when said oven switch is in the "bake" position and a second window positioned so as to overlie said indicating member when said oven switch is in the "broil" position, and said spiral boundary line being so positioned on said indicating member that its position relative to each of said windows when the latter overlies said indicating member provides an indication of the heat setting of said thermostat.

2. A range oven control comprising an oven thermostat having a first shaft rotatable through a range of temperature setting positions, an oven switch having a second shaft rotatable between "bake" and "broil" positions, each of said first and second shafts being independently rotatable irrespective of rotation of the other, a rotatable temperature indicating member secured to said first shaft, said indicating member having a central area of one color and a peripheral area of another color, said areas having a common spiral boundary line extending from a point adjacent the axis of said first shaft to a point adjacent the periphery of said indicating member, an opaque masking member mounted on said second shaft and arranged to partially overlie said indicating member, said masking member having a first window positioned so as to overlie said indicating member when said oven switch is in the "bake" position and a second window positioned so as to overlie said indicating member when said oven switch is in the "broil" position and said spiral boundary line on said indicating member being so positioned that the colored areas visible through each of said windows when overlying said indicating member provides an indication of the heat setting of said thermostat.

3. A range oven control comprising an oven thermostat having a first shaft rotatable through a range of temperature setting positions, an oven switch having a second shaft parallel to said first shaft and rotatable to "bake," "time bake," "broil" and "off" positions mutually spaced ninety degrees apart, each of said first and second shafts being independently rotatable irrespective of rotation of the other, a rotatable indicator disk secured to said first shaft, said indicator disk having a central area of one color and a peripheral area of another color, said areas having a common spiral boundary line extending from a point adjacent the axis of said first shaft to a point adjacent the periphery of said indicator disk, an opaque masking disk mounted on said second shaft and arranged to partially overlie said indicator disk, said masking disk having a first generally radial slot positioned so as to overlie said indicator disk when said oven switch is actuated to its "bake" position and a second generally radial slot angularly displaced ninety degrees from said first slot and positioned so as to overlie said indicator disk when said oven switch is actuated to its "time bake" position, said masking disk having temperature indicia thereon adjacent each of said first and second slots, said masking disk having a third generally radial slot angularly displaced one-hundred-eighty degrees from said first slot and positioned so as to overlie said indicator disk when said oven switch is actuated to its "broil" position, said masking disk having indicia thereon adjacent said third slot indicating a range of broiling rates, and indicia spaced diametrically opposite said second slot indicating the "off" position of said oven switch, and said spiral boundary line on said indicating disk being so positioned that the colored areas visible through each of said slots when overlying said indicating disk provides an indication of the heat setting of said thermostat.

4. A range oven control comprising an oven thermostat having a first shaft rotatable through a range of temperature setting positions, an oven switch having a second shaft parallel to said first shaft and rotatable to "bake," "time bake," "broil" and "off" positions mutually spaced ninety degrees apart, a rotatable translucent indicator disk secured to said first shaft, said indicator disk having a central area of one color and a peripheral area of another color, said areas having a common spiral boundary line extending from a point adjacent the axis of said first shaft to a point adjacent the periphery of said indicator disk, an opaque masking disk mounted on said second shaft and arranged to partially overlie said indicator disk, said masking disk having a first generally radial slot positioned so as to overlie said indicator disk when said oven switch is actuated to its "bake" position and a second generally radial slot angularly displaced ninety degrees from said first slot and positioned so as to overlie said indicator disk when said oven switch is actuated to its "time bake" position, said masking disk having temperature indicia thereon adjacent each of said first and second slots, said masking disk having a third generally radial slot angularly displaced one-hundred-eighty degrees from said first slot and positioned so as to overlie said indicator disk when said oven switch is actuated to its "broil" position, said masking disk having indicia thereon adjacent said third slot indicating a range of broiling rates, and indicia spaced diametrically opposite said second slot indicating the "off" position of said oven switch, said spiral boundary line on said indicating disk being so positioned that the colored areas visible through each of said slots when overlying said indicating disk provides an indication of the heat setting of said thermostat, a light source supported adjacent said indicator disk so as to direct light through the portion thereof underlying said masking disk, and a cover plate overlying said disks, said cover plate having a viewing aperture located so as to overlie the indicia bearing portion of said masking disk which overlies said temperature indicator.

References Cited in the file of this patent

UNITED STATES PATENTS 2,139,451    Konig _____ Dec. 6, 1938